J. A. Pitts,
Horse Power.
No 1,185. Fig. 1 Reissued May 14. 1861.
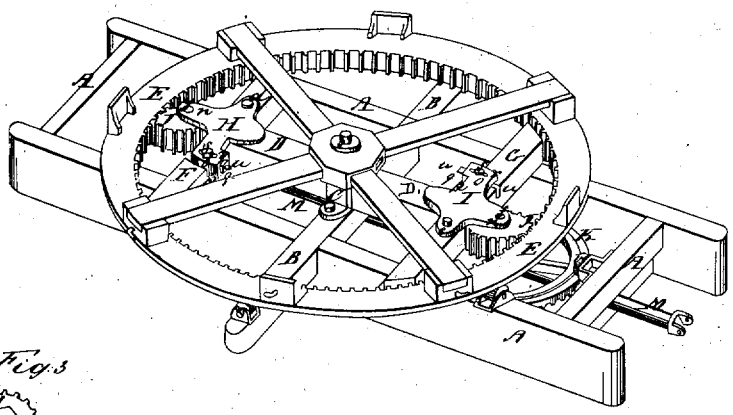
Fig. 3
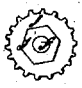
Fig. 2
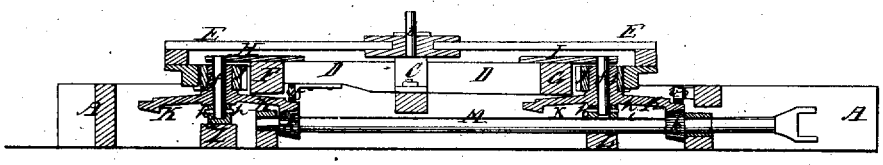
Fig. 4
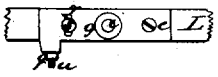
Fig. 5
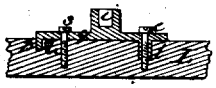
Fig. 6
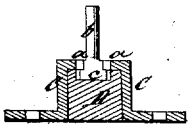
Fig. 7
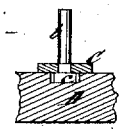
Fig. 8
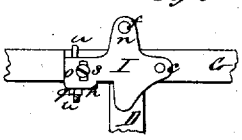
Fig. 9
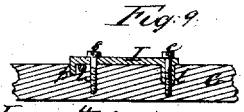
Witnesses.
J. Cohen
Julius Hirsh
Inventor John A. Pitts
James Brayley Adm
Mary Pitts Adm't
By A. B. Stoughton attorney

UNITED STATES PATENT OFFICE.

JAMES BRAYLEY AND MARY PITTS, OF BUFFALO, NEW YORK, ADMINISTRATORS OF JOHN A. PITTS, DECEASED.

IMPROVEMENT IN HORSE-POWER.

Specification forming part of Letters Patent No. 11,232, dated July 4, 1854; Reissue No. 1,185, dated May 14, 1861.

*To all whom it may concern:*

Be it known that JOHN A. PITTS, late of Buffalo, in the county of Erie and State of New York, now deceased, did in his life-time invent certain new and useful Improvements in Horse-Powers; and we do hereby declare that the following is a full, clear, and exact description of the same, reference being had to the accompanying drawings, making a part of this specification, in which—

Figure 1 represents a perspective view of a horse-power with the improvement attached. Fig. 2 represents a vertical section through the same, taken longitudinally of the frame. Figs. 3, 4, 5, 6, 7, 8, and 9 represent details of the machine, which will be designated, respectively, by letters of reference, or by reference thereto in the description.

Similar letters of reference wherever they occur denote like parts of the machine in all the figures.

The hanging of a wheel that gears with two other wheels upon a movable pin, so as to allow it to adjust itself to the two wheels, has long been known and practiced in connection with horse-powers, and is not claimed as the invention of the said JOHN A. PITTS, now deceased, though it is believed that he was the first to so hang an internal-gear master or main wheel. There are, however, other difficulties in double-geared horse-power machines to provide against besides that of making the master or main wheel work truly and smoothly with its pinions, for these pinions give motion to beveled gears connected with them, and the bevel-gears work into bevel-pinions that are fixed upon the transmitting-shaft, so that any inaccuracies of the workman or any springing or yielding of the machine itself by use, is likely to make these gearings work untruly and unequally, throwing more strain upon one set than upon the other set of gears, and thus causing them to bind and wear away; and the said JOHN A. PITTS, now deceased, was the first person who discovered that, in addition to the self-adjusting motion given to an internal-gear main wheel that allowed it to work truly and smoothly with its two pinions, (each of the three wheels having its own independent bearings,) another serious difficulty could be obviated by making an adjustment between the pinions so worked—the bevel-gears working with or from said pinions—and the two bevel-pinions on the transmitting-shaft, so that duplicate driving-gears might be used advantageously between the main drive-wheel and the transmitting-shaft, the latter shaft turning in fixed bearings, and the main drive-wheel on a movable bearing.

And the invention of the said JOHN A. PITTS, now deceased, consisted, first, in so combining an internal-geared main driving-wheel with two pinions working at diametrically-opposite sides thereof as that said main wheel might move in a direction transverse to that of a line drawn through said pinions, for the purpose of allowing the said main wheel to automatically adjust itself to the pinions.

And the said invention further consisted in making the pinions of a double-geared horse-power adjustable to the main drive-wheel, so that the machine may be put in true working order by setting the cogs properly in gear.

And the said invention consisted, further, in so combining the pinions of a double-geared horse-power with the bevel-gears that work into the bevel-pinions on the line-shaft as that both the pinions and the bevel-gears may be adjusted to keep their shaft perpendicular, and to truly and evenly work with their adjacent wheels, as will be explained.

To enable others skilled in the art to make and use the invention of the said JOHN A. PITTS, deceased, the subjoined description is given.

A substantial frame, A, having been first provided, the middle cross-piece, B, of which has a pillar-block, C, firmly bolted to it, and through or under this pillar-block a longitudinal piece, D, passes, which forms what may be termed the "bridge-tree" of the horse-power. This pillar-block C has in it an oblong hole, as shown at *a*, Fig. 6, through which the inverted king-bolt, *b*, may move, the head *c* of said king-bolt moving under the said pillar-block C, as seen in Fig. 7, so that it cannot leave said oblong hole or opening, and enough of the cross-piece D is cut away to allow the head of the bolt to move in and in close contact with the under side of the pillar-block C. The main drive-wheel E, having its cogs formed internally thereon, is hung on this pin or bolt *b*, and can, with said bolt, move in the direction of the oblong slot in the pillar-block C, which slot or opening is at right angles to the line of the piece D, which has been termed the bridge-tree of the machine.

Upon the cross-pieces F G of the main frame are pivoted, as at *d e*, the bridge-tree plates H I, being alike in form, but hung so as to swing in opposite directions. These bridge-tree plates form the upper bearings for the shafts or journals *f f* of the pinions J and bevel-wheels K, the lower bearings of said shafts or journals being in a plate, *g*, Figs. 4, 5, which is made adjustable on the cross-pieces L L. The shafts *f f* may turn with the pinions J and bevel-wheels K. They are, however, here shown as being immovable, a pin, *h*, passing through them and through the step or cup *i*, in which they stand. The hubs or centers of the bevel-wheels K are long, and slip over the pins or shafts *f f*, fitting snugly and running freely thereon. The outer sides of the hubs are hexagonal in form, or many-sided, and the boxes *j* of the pinions J, as seen in Fig. 3, are made of a similar form, so as to fit over the hubs of the bevel-wheels. The object of this is to make the pinions carry the bevel-wheels with them, both being loose on the shafts *f*.

The bevel-wheels K take into bevel-pinions *k*, respectively, on the line-shaft M, and from this shaft the power is transmitted to the machinery to be driven by it. Over the bevel-wheels K, where they take into the bevel-pinions *k*, there are friction-rolls *v*, to keep the wheels in mesh.

The bridge-tree plates H I are formed or made as follows: A boss, *l*, is made on its under side, through which a screw-bolt, *e*, passes, to hold it to the wooden cross-piece G, and so that the plate may turn on the boss, and thus prevent the screw from cutting out in the wood. One of the arms, *n*, of the bridge-tree plate forms a support to the pinion-shaft *f*. The other arm, *o*, has a lip and flange, *p*, on its under side, which are let into or against the wood, and a screw-bolt, *u*, passes horizontally through this lip and is secured to the cross-piece G, so that by the nut *q* the bridge piece or plate may be turned. There is also a slot, *r*, in said arm *o*, through which a set-screw, *s*, passes, to hold the plate when adjusted to the frame-pieces F G, as represented.

The under plates, *g*, differ only from those H I by having a cup-bearing, *i*, for the shaft *f*, instead of the arm *n* and its bearing, as in the upper plates. These under plates on the frame-pieces L have bosses *l* and screw-bolts *e* passing through said bosses, a slot, *r*, and set-screws, *s*, working in it, with a lip, *p*, and screw bolt *u* working in it, with a nut, *q*, just as in the bridge-tree plates, and for a similar purpose, said under plates being shown in detail at Figs. 4 and 5, and the bridge-tree or upper plates at Figs. 1, 2, but more especially at Figs. 8 and 9.

The arms of the main drive-wheel, the shoes or castings thereon for the sweeps, the friction-rolls for keeping said wheel horizontal and for preventing undue weight on its center, are shown, and need not be further described.

The purpose and object of these adjusting-plates will readily be understood from the description and drawings. Their importance will be duly appreciated from the following directions for putting the horse-power in running order. If the teeth of each pinion J be in line exactly, the drive-wheel can be put in place readily so as to work true, but such a thing can scarcely ever be looked for as finding these pinions in line—it would be accidental if ever so found. When not in line with the center of the bridge-tree piece, then one of the pinions must be put in line, and at the other end of the machine the friction or traverse roll *v* is detached, the bevel-gear K raised up out of gear with the pinion *k*, and said wheel K, with the pinion connected to it, turned around until its pinion comes in line. It is then let down and the roll put in place; but these pinions must mesh up close into the main drive-wheel and the bevel-wheels come down snug to the pinions on the line-shaft, and to accomplish this the top or bottom plates must be used, or both, being careful to always keep the shaft of the pinion and bevel gear-wheel in a perpendicular position. To use these plates the set-screw *s* is loosened up, and the nut *q* on the bolt *u* be used for running the pinions close into the main drive-wheel, and when in close mesh the set-screw is again tightened. As the teeth of the gearing wear away they may continue to be run up into close mesh, in which position they run with more ease, less noise, and less wearing away.

What is claimed as the invention of JOHN A. PITTS, now deceased, is—

1. So combining an internal-gear main driving-wheel with two pinions working at diametrically-opposite sides thereof as that said main wheel may move in a direction transverse to that of a line drawn through said pinions for the purpose of allowing said main wheel to automatically adjust itself to said pinions, substantially as and for the purpose set forth.

2. Hanging the pinions of a double-geared horse-power in adjustable bearings so that they may be set in close mesh with the main or master wheel, substantially as described.

3. In so combining the pinions and bevel-wheels upon one shaft, in pairs, and supporting them in adjustable bearings, as that their shafts may be kept in a perpendicular position, while the two gears are made adjustable to the respective wheels that they mesh with, substantially as described.

JAMES BRAYLEY,
*Administrator of the estate of John A. Pitts, deceased.*
MARY PITTS,
*Administratrix of the estate of John A. Pitts, deceased.*

Witnesses:
IRA R. AMSDEN,
THOMAS SULLY.